United States Patent
Mumma et al.

(10) Patent No.: US 10,944,742 B2
(45) Date of Patent: Mar. 9, 2021

(54) DIGITAL INTEGRATION TOKEN

(71) Applicant: Bank of America Corporation, Charlotte, NC (US)

(72) Inventors: Robert S. Mumma, Chicago, IL (US); John E. Scully, Wilmette, IL (US); Patrick E. Burgess, Jr., Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 355 days.

(21) Appl. No.: 16/052,758

(22) Filed: Aug. 2, 2018

(65) Prior Publication Data

US 2020/0045038 A1 Feb. 6, 2020

(51) Int. Cl.
*H04L 29/06* (2006.01)
*G06F 21/45* (2013.01)
*H04W 12/06* (2021.01)

(52) U.S. Cl.
CPC .......... *H04L 63/0838* (2013.01); *G06F 21/45* (2013.01); *H04W 12/06* (2013.01); *H04L 63/0861* (2013.01); *H04L 2463/082* (2013.01)

(58) Field of Classification Search
CPC ........... H04L 63/0838; H04L 2463/082; H04L 63/0861; G06F 21/45; G06F 21/41; G06F 21/34; G06F 21/33; H04W 12/06; H04W 12/0808; H04W 12/0608; G06Q 20/3263; G06Q 20/326; G06Q 20/385
USPC .......................................................... 726/6
See application file for complete search history.

(56) References Cited

U.S. PATENT DOCUMENTS

| | | |
|---|---|---|
| 8,510,811 B2 | 8/2013 | Kuang et al. |
| 9,038,157 B1 | 5/2015 | Santiago, Jr. et al. |
| 9,294,476 B1 | 3/2016 | Lurey et al. |
| 9,361,616 B2 | 6/2016 | Zhou et al. |
| 9,398,000 B2 | 7/2016 | Grigg et al. |
| 9,424,575 B2 | 8/2016 | Grigg et al. |
| 9,569,759 B2 | 2/2017 | Gangapurkar |

(Continued)

OTHER PUBLICATIONS

Vikas Sehgal, "How Does the OTP (one-time password) work?" https://www.quora.com/How-does-the-OTP-one-time-password-work, Mar. 12, 2016.

(Continued)

*Primary Examiner* — Kambiz Zand
*Assistant Examiner* — Aubrey H Wyszynski
(74) *Attorney, Agent, or Firm* — Weiss & Arons LLP; Michael A. Springs, Esq.

(57) ABSTRACT

A secure storage apparatus on a mobile device for securing user-access to a mobile application is provided. The secure storage may include, an electronic representation of a mobile token pin selected and inputted when authenticating a user for a first time and an OTP seed, stored in the secure storage. The secure storage may be a secure portion of memory on the mobile device only accessible and visible to the mobile application upon receipt of the mobile token pin. When the mobile token pin is inputted into the mobile application on the mobile device, the mobile application may be configured to transmit the mobile token pin to an authentication server for verification. In response to the verification, the OTP seed may be released from the secure storage and activate an OTP application associated with the mobile application to generate, transparent to the user, an OTP.

20 Claims, 3 Drawing Sheets

(56) References Cited

U.S. PATENT DOCUMENTS

| | | | |
|---|---|---|---|
| 9,576,285 B2 | 2/2017 | Zhou | |
| 9,589,263 B2 | 3/2017 | Griffin | |
| 9,852,426 B2 | 12/2017 | Bacastow | |
| 9,858,405 B2 | 1/2018 | Ranadive et al. | |
| 9,898,736 B2 | 2/2018 | Graylin et al. | |
| 2011/0197266 A1* | 8/2011 | Chu | H04L 9/3228 |
| | | | 726/5 |
| 2017/0032370 A1* | 2/2017 | Beltramino | G06Q 20/38215 |

OTHER PUBLICATIONS

"Security Token," https://en.wikipedia.org/wiki/Security_token, Wikimedia Foundation, Inc., May 10, 2018.
"One Time Password," https://en.wikipedia.org/wiki/One-time_password, Wikimedia Foundation, Inc., May 28, 2018.
"Software Development Kit," https://en.wikipedia.org/wiki/Software_development_kit, Wikimedia Foundation, Inc., Jul. 5, 2018.

* cited by examiner

DIGITAL INTEGRATION TOKEN

FIELD OF TECHNOLOGY

Aspects of the invention relate to mobile applications. In particular, aspects of the invention relate to enabling user-access to secure mobile applications using features of a one-time password ("OTP".)

BACKGROUND OF THE DISCLOSURE

Mobile applications are developing rapidly. The security associated with many applications is out of date. In fact, the security within many mobile applications can be easily compromised. Developers are constantly seeking new ways to enhance the security within mobile applications. Many applications require multi-factor authentication ("MFA") to enhance the security within each mobile application.

MFA may implement two or more ways to identify the user. By using a one-time password ("OTP") for accessing an application, a user may be required to have two factors of authentication. When an OTP is implemented for accessing mobile applications, two-factor authentication may be used in order for the OTP to be generated. A personal pin, along with a dynamic physical password generator, may be used together for authentication. A user that possesses a dynamic physical password generator token i.e.—keyring fob or smartcard—may push a button on the token and a random 6-digit number will be generated. The user may then be required to copy the 6-digit code into a field on the mobile application. The code may be validated and the user may then access the application. A user that does not possess a physical token may have a mobile soft-token. The mobile soft token may be accessed via an OTP application. The user may be required to leave a current mobile application and open the OTP application to obtain a 6-digit code. The user may enter in a personal pin and then upon verification, the 6-digit code is generated. The user may then copy the code and paste it back into the mobile application the user is attempting to access.

Both the physical token and the mobile soft-token require the user to enter the code into the mobile application. This is an additional step (or more than one step) that may frustrate the user, and in certain circumstances, may delay the user from accessing a mobile application that the user may need to access immediately.

Therefore, it would be desirable to simplify the user's experience in mobile applications that require an OTP by eliminating specific steps while still maintaining multi-factor authentication.

SUMMARY OF THE DISCLOSURE

Systems and methods for integrating a one-time password ("OTP") application within a mobile application while maintaining multi-factor authenticity are provided. The integration may include integrating leveraging of a legacy software development kit ("SDK") associated with the mobile application. The SDK may be wrapped with the mobile application for implementation of the OTP application within the mobile application.

The mobile application may be running on a mobile device of a user. Examples of mobile devices that may be suitable for use with the invention include, but are not limited to, cellphones, smartphones, personal digital assistants ("PDA"), tablet computers and laptops.

The method may include receiving login credentials from a user. The login credentials may be used for enabling user-access to the mobile application. The login credentials may include an ID. The login credentials may also include a password. The input of both the ID and the password for verification, may be used, prior to accessing the mobile application.

In an alternative embodiment, the login credentials may include an ID and a biometric associated with the user. The biometric may include a fingerprint. The biometric may include facial recognition. The biometric may include behavioral characteristics. The biometric may include other suitable biometrics within the scope of the invention.

In response to receiving the login credentials, the method may further include transmitting the login credentials to an authentication server. The authentication server may be associated with the mobile application. The authentication server may be configured to verify the user's login credentials.

When the authentication server verifies the login credentials, the method may further include, enabling user-access to the mobile application. The mobile application may be configured to enable the user to view a user's account. The mobile application may be configured to accept a request from a user. The request may be a request that does not involve an additional layer of security. When the request does not involve additional authentication, the request may be executed immediately.

However, in certain embodiments, the request may be a request that does involve an additional layer of security. When the user submits a request involving an additional layer of security, the method may further include input of a mobile token pin in order to generate an OTP to authenticate the request. An OTP, for the purpose of this disclosure, is a password that is generated and only valid for one-time use. If an unauthorized attempt was made to access the mobile application using the generated (and already once-used) OTP, the attempt may not be carried out since the OTP may no longer be valid.

In order to generate the OTP, the method may further include prompting the user for input of the mobile token pin. The mobile token pin may be a numeric character set. The mobile token pin may be an alpha-numeric character set. The mobile token pin may be a biometric. The mobile token pin may be a pin the user selected and inputted to the mobile application at a first time authentication to enable accessing aspects of the application that involve an OTP. An electronic representation of the mobile token pin the user selected the first time, may be stored in a secure storage area on the mobile device associated with the user for future authentication and verification.

In response to the prompt for user-input of the mobile token pin, the method may further include receiving the mobile token pin. The method may further include verifying the inputted mobile token pin. The verifying may be verified via the SDK. The verifying may include, confirming the mobile token pin corresponds to the electronic representation of the pin.

The method may further include, in response to the verification, releasing an OTP seed, via the SDK, to activate the OTP application. The OTP seed may be stored in the secure storage area. The OTP seed may be coupled to the electronic representation of the pin. The OTP seed may be accessible by the electronic representation of the pin. The OTP seed may be a starting value for an algorithm used for generating the OTP. The OTP seed may be a dynamic value. The OTP seed may be a value based on time. The OTP application may use the OTP seed along with other suitable information, to generate the OTP. The OTP application may be an application that is transparent to the user.

When the OTP seed is released from the secure storage, the OTP seed may activate the OTP application to generate the OTP. The method may further include generating an OTP via the OTP application. The method may further include populating the OTP, via the SDK, in an OTP field on the mobile application. The populating may be done transparent to the user. The populating may further be done independent of user-interaction.

When the OTP is populated in the OTP field, the method may further include validating the OTP. The OTP may be validated, downstream, on an authentication server. The authentication server may validate the OTP. The authentication server may use the algorithm that the OTP application may be using to generate the OTP, in order to validate the OTP. In response to the validation received from the authentication server, the method may further include executing the user's request. In certain embodiments, the OTP may be validated within the mobile device itself.

When the mobile token pin does not correspond to the electronic representation of the pin stored in the secure storage area on the mobile application, this may indicate that an unauthorized attempt has been made to the user's mobile application and/or secure data associated with the user. In this embodiment, when the mobile token pin is not verified, the method may further include blocking access to the secure storage area. Once the secure storage area is blocked, access to the OTP seed may also be blocked. This is an additional level of protection for the secure data of the user. Since the OTP seed is blocked, the OTP seed may not be released. Without the release of the OTP seed, the OTP application may not be able to generate an OTP.

In certain embodiments, when the mobile token pin does not correspond to the electronic representation of the pin stored in the secure storage area, the method may further include enabling inputting a first alternative mobile token pin. The user may have mistyped the pin. The user may have forgotten the mobile token pin. This may give the user an opportunity to re-enter an alternative pin. The method may further include verifying the inputted alternative mobile token pin.

When the first alternative mobile token pin does not correspond to the electronic representation of the pin stored in the secure storage area, the method may further include enabling inputting a second alternative mobile token pin. The method may further include verifying the inputted second alternative mobile token pin.

The method may enable the user two or more opportunities to input a mobile token pin for authentication. When the second alternative mobile token pin does not correspond to the electronic representation of the pin, the method may further include destroying the secure storage area. The destroying may include erasing the electronic representation of the pin and the OTP seed stored in a portion of memory within the secure storage area of the mobile device. When the secure storage area is not accessible, the method may further include locking-down the OTP application. Once the OTP application is locked, the OTP may not be generated and the request may not be executed.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to a system for integrating a one-time-password ("OTP") application within a mobile application. The system may include a mobile device. The mobile application may run on the mobile device. The mobile device may include a display. The display may display data on the mobile device. A mobile device may have a plurality of mobile applications running on the device. Some of the mobile applications may include applications linking to social media, lifestyle, games and/or utility. Other mobile applications running on the device may include applications that may include secure data of the user. For applications that may include secure data of the user, multi-factor authentication ("MFA") may be implemented for the user to gain access to those applications. MFA may further be implemented for executing communication requests within the mobile application.

The mobile application on the mobile device may include a receiver module. The receiver module may be configured to receive an electronic communication request from a user of the mobile application. The communication request may be a request that necessitates MFA prior to execution of the communication request. The request may be a request that involves two-factor authentication ("2FA"). 2FA is a type of MFA. The first-factor authentication may be something the user possesses. A second-factor of authentication may be something the user knows. In certain embodiments, there may be a third-factor of authentication. The third-factor of authentication may be something the user is. The third-factor may be a biometric.

In order for the system to generate an OTP, the OTP may involve access to something the user possesses and in addition, something the user knows. The mobile device of the user may be the first-factor of authentication. The mobile device may need to be in the possession of the user at the time the electronic communication request is requested. Input of a mobile token pin may be the second-factor of authentication. The mobile token pin may be a pin that only the user knows. The user may have selected the mobile token pin the first time the user attempted requesting an electronic communication request that involves additional layers of authentication. The OTP application may be configured to generate the OTP when both the mobile token pin is validated and the mobile device is within the user's possession.

In certain embodiments, the second-factor of authentication may include a biometric instead of a mobile token pin.

The mobile application on the mobile device may further include a processor module. The processor module may be configured to process the electronic communication request. In response to the processing of the request, the processor module may be further configured to trigger a prompt to the user to input the mobile token pin.

The mobile application on the mobile device may further include an authentication module. The authentication module may be configured to transmit the mobile token pin to an authentication server to confirm that the mobile token pin corresponds to an electronic representation of the pin. The electronic representation of the pin may be stored in a secure storage area on a mobile device associated with the user. An OTP seed may also be stored in the secure storage area on the mobile device. The OTP seed may be coupled to the electronic representation of the pin. The OTP seed may be configured to trigger the generation of an OTP via the OTP application.

When the authentication module, via the authentication server, confirms that the mobile token pin corresponds to the electronic representation of the pin, the secure storage area may be configured to release the OTP seed to the OTP application. The OTP application may be an application that is transparent to the user. The OTP application may not be displayed on the display of the mobile device. The OTP application may be running and processing internally.

In response to the release of the OTP seed from the secure storage area, the processor module may be further configured to activate the OTP application to generate an OTP. When the OTP is generated, the processor module may be further configured to populate the OTP in an OTP field. The populating of the OTP field may also be done transparently. The populating may be completed, independent of user-interaction.

When the OTP is populated in the OTP field, the authentication module may be further configured to verify the OTP. The authentication module may verify the generated OTP based on the OTP seed stored in the secure storage area.

In certain embodiments, the communication request may be a first communication request. When the first communication request is executed, the system may be further configured to receive a second communication request from the user. An OTP may be used in order to authenticate the second communication request. When the second communication request is received after a pre-determined shortened time period, the system may be further configured to receive from the user, re-input of the mobile token pin in order to generate a new OTP. Each generated OTP may be valid for only a short period of time in order to protect attempted intruders from gaining access to secure data of the user. If a potential intruder records an OTP that the user inputted, the intruder may not be able to use it, since it may no longer be valid.

A secure storage apparatus on a mobile device is provided. The secure storage apparatus may be for securing user-access to a mobile application that involves an OTP. The secure storage may be a portion of memory on the mobile device that is hard-wired for storing secure data. In certain embodiments, the secure storage may be a portion of memory on the mobile device that is soft-wired for storing secure data.

The secure storage may include an electronic representation of a mobile token pin stored within the secure storage. The electronic representation may be a representation of the pin a user selected and inputted when authenticating the user for a first time on the mobile application.

The secure storage may further include an OTP seed stored in the secure storage. The OTP seed may be coupled to, and accessible by, the electronic representation of the pin. When the mobile token pin is inputted into the mobile application on the mobile device, the mobile application may be configured to transmit the mobile token pin to an authentication server for verification. The authentication server may be configured to compare the inputted mobile token pin to the electronic representation of the pin stored in the secure storage. In response to the verification, the secure storage may be configured to release the OTP seed from the secure storage. The OTP seed may be configured to activate an OTP application associated with the mobile application. The OTP application may be further configured to generate the OTP.

In response to the generating of the OTP, the OTP application may be further configured to transmit the OTP to the authentication server for verification. The authentication server may verify the OTP. In response to the verification, the OTP application may be configured to populate, transparently, the OTP in an OTP field, independent of user-interaction and enable user-access to the mobile application.

In certain embodiments, the authentication server may determine that the mobile token pin does not correspond to the electronic representation of the pin. When correspondence is not determined, the secure storage may be locked. When the secure storage is not accessible, the mobile application is configured to lock-down the OTP application. The mobile token pin may not correspond to the electronic representation of the pin when an attempted hacker gains access to the mobile device of the user. The attempted hacker may not be able to access secure applications within them mobile device. Although the outsider may have the mobile device in his possession, the mobile token pin may not be known to the outsider and therefore may not have access to the secure storage on the mobile device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1A:
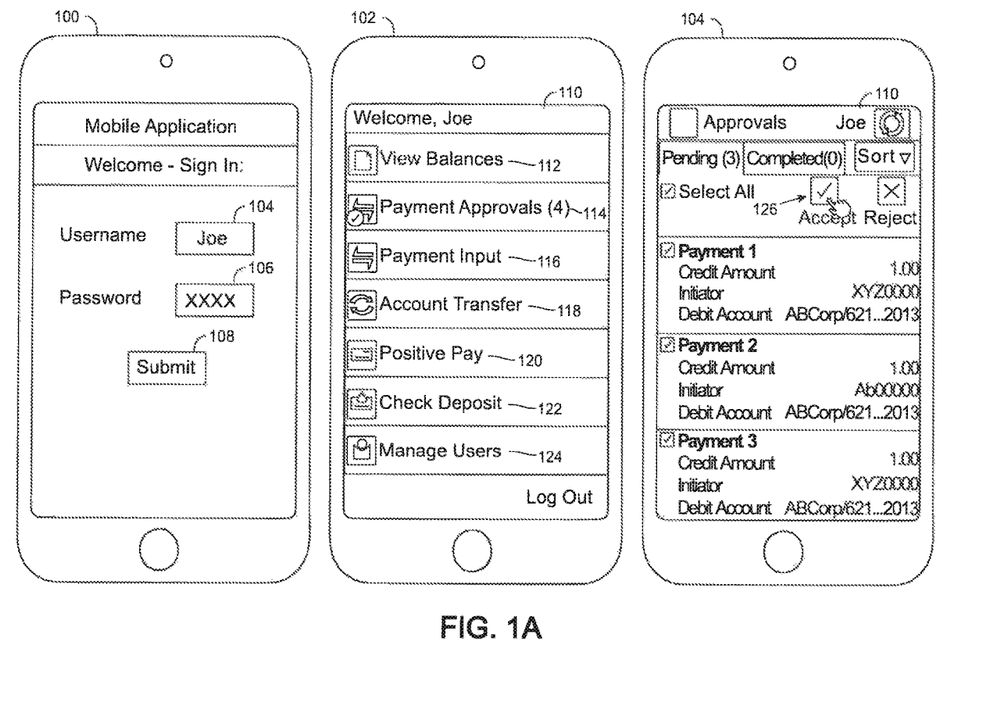
FIG. 1A shows a graphical user interface ("GUI") in accordance with principles of the invention.

FIG. 1A shows exemplary first display 100, second display 102 and third display 104 of a mobile application on a mobile device associated with a user. The exemplary mobile application may be a banking application. Display 100 may display a log-in page of the mobile application. The log-in page may include a username input-field 104 and a password input-field 106. Input of a username into input-field 104 and a password into input-field 106, may be necessary, in order to access the mobile application. Upon submission of both the username and password at 108, the mobile device may be configured to display second display 102.

Second display 102 may display a plurality of selectable user-options that may be available for user 110 associated with the mobile device. User-option view balances 112 may, upon selection by the user, display the amount of money the user may have in one or more accounts. Payment approvals 114 may, upon selection by the user, display pending payments and completed payments associated with the user. Payment input 116, account transfer 118, positive pay 120, check deposit 122 and manage users 124 may be other selectable user-options displayed on display 102. One or more of the selectable user-options may involve additional authentication prior to execution of a request within the user-option. In this exemplary display 102, user 110 selects the user-option payment approvals 114. Upon selection of payment approvals 114, the mobile device may be configured to display the third display 104 on the mobile device.

Within third display 104, there may be three payments pending for approval. User 110 may select the three pending payments and may approve execution of the payments at accept button 126. Accept button 126 may initiate an instruction to transmit an electronic communication request to the mobile application for approving and executing the payments. The request for execution of payments may entail additional authentication of user 110. Additional authentication may be portrayed at FIG. 1B.

Figure 1B:
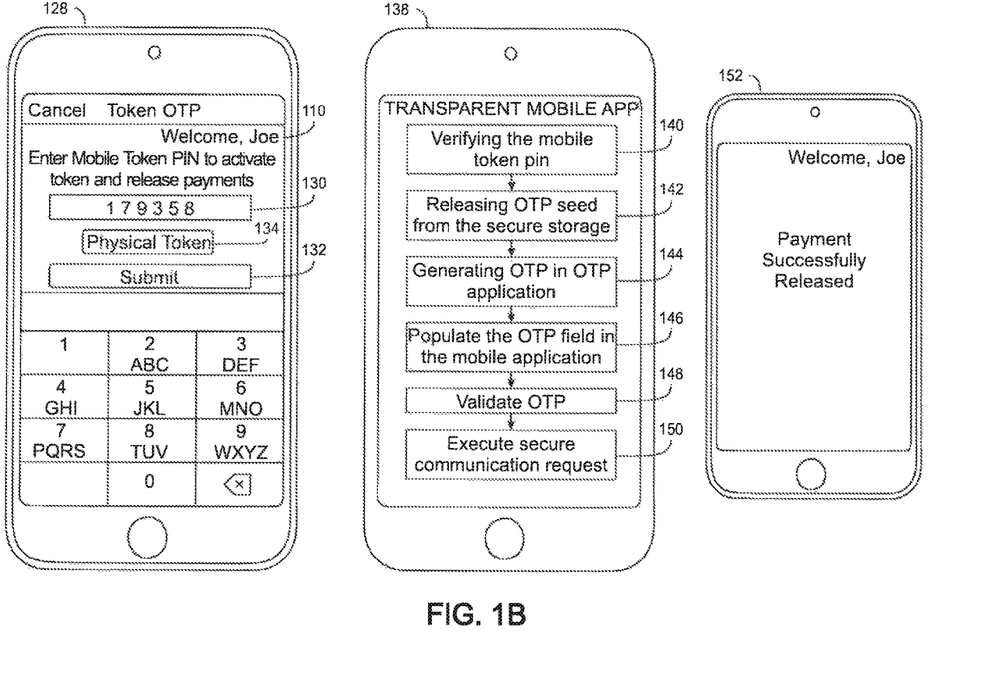
FIG. 1B shows another GUI in accordance with principles of the invention.

FIG. 1B shows exemplary fourth display 128 for authenticating user 110 using two-factor authentication. In order for user 110 to approve processing of payments that may be associated with the user's account, the mobile application may be configured to receive input of a mobile token pin into input-field 130. The mobile token pin may be a pin the user 110 selected at a first time authentication when executing requests that involve two-factor authentication within the mobile application. A representation of the mobile token pin the user selected may be stored in a secure storage area on the user's mobile device.

User 110 may input the mobile token pin into input-field 130. The user 110 may submit the token at submit button 132. The mobile application may be configured to transmit the mobile token pin to an authentication server for verification.

Display 138 may not actually be displayed to the user. Display 138 may demonstrate the process for two-factor authentication within the mobile application. The process within display 138 may be transparent to the user. At step 140, the mobile application may verify the inputted mobile token pin via the authentication server 154. Authentication server 154 may compare the mobile token pin to the representation of the mobile token pin stored in the secure storage area of the user's mobile device. Upon verification, the secure storage may be configured to release an OTP seed from the secure storage area as shown at step 142. At step 144, the OTP seed may activate the OTP application to generate an OTP. At step 146, the OTP may be populated into an OTP field on the mobile application. The generating and the populating may be done transparent to the user. The OTP may then be validated at step 148, via an authentication server. Once the OTP is validated, the communication request of the user 110 may be executed, as shown at step 150. Display 152 may display to the user the result of the communication request. In this example, the two-factor authentication for verifying the user may be verified and the mobile application may successfully release the payments based on the user's request.

Figure 2:
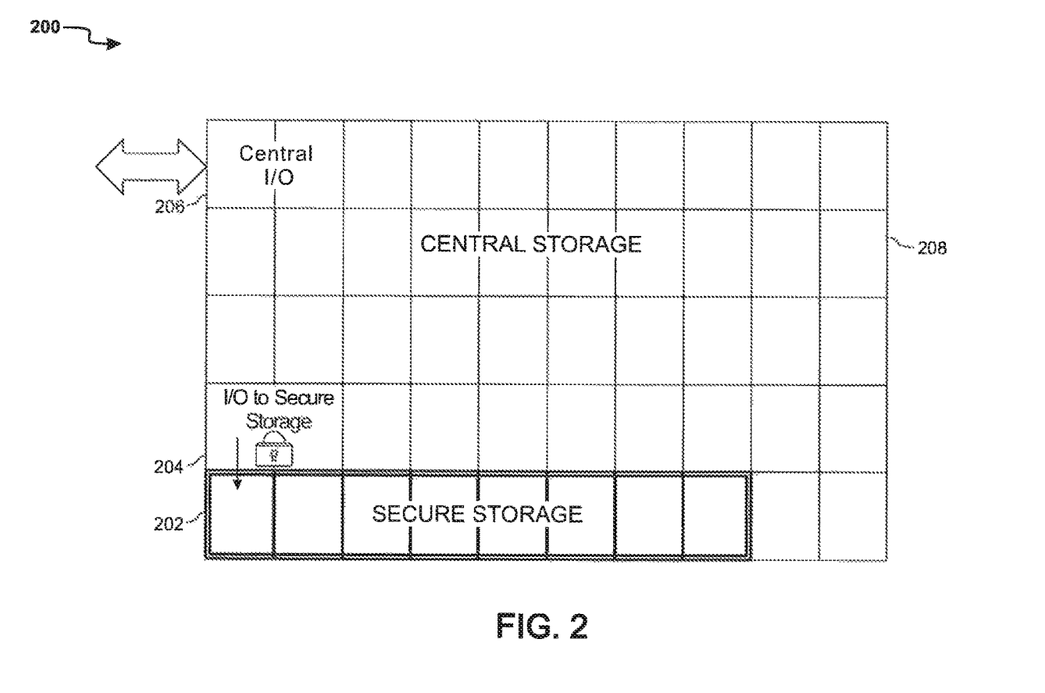
FIG. 2 shows an illustrative apparatus in accordance with principles of the invention.

FIG. 2 shows illustrative architecture 200. Architecture 200 may represent data storage. The data storage may be coupled to a mobile device. The data storage may form a portion of memory on the mobile device. The data storage 200 may be configured to store data. Some of the data may be stored in the central storage 208. Data stored in central storage 208 may be accessed via central input/output ("I/O") module 206.

Some of the data may be secure data. The secure data, according to this embodiment may be stored in the secure storage 202 of data storage 200. The secure data may be the data associated with the activation of an OTP. A user associated with the mobile device may select a mobile token pin for accessing secure mobile applications. A user may as an alternative, use a biometric for accessing secure mobile applications. The mobile token pin that the user may select may be secured in the secure storage 202 within the data storage 200. A biometric associated with the user may be stored in the secure storage 202 within the data storage 200. In certain embodiments the secure data may be encrypted in order to protect the data.

The data stored in the secure storage 202 may be accessed through a secure I/O module 204. The secure I/O module 204 may restrict access to the secure storage 202 that houses the representation of the mobile token pin of the user and the OTP seed coupled to it. The secure I/O module may only enable access to the secure storage 202, and further enable activation and generation of the OTP, upon verification of the inputted mobile token pin.

Thus, methods and apparatus for integrating an OTP application within a mobile application have been provided. Persons skilled in the art will appreciate that the present invention can be practiced by other than the described embodiments, which are presented for purposes of illustration rather than of limitation. The present invention is limited only by the claims that follow.

What is claimed is:

1. A method for integrating a transparent one-time-password ("OTP") application, the OTP application comprising a first mobile application, within a second mobile application, while maintaining multi-factor authentication, the integrating leveraging a legacy software development kit ("SDK") associated with the second mobile application, the method comprising:

receiving login credentials from a user of the second mobile application for enabling accessing the second mobile application on a user mobile device, the login credentials including:
an ID; and
a password;
transmitting the login credentials to an authentication server associated with the second mobile application for verification;
in response to the verification, enabling accessing the second mobile application;
receiving an electronic communication request from the user of the mobile application, wherein the communication request requires an OTP to execute the communication request;
prompting the user for input of a mobile token pin associated with the user;
receiving, from the user, the mobile token pin;
verifying, via the SDK, the inputted mobile token pin, the verifying comprising confirming the mobile token pin corresponds to an electronic representation of the pin stored in a secure storage area on the user mobile device, the secure storage area being a secure portion of memory on the mobile device, whereby the portion of memory is only accessible and visible to the second mobile application upon receipt of the mobile token pin;
in response to the verification, releasing, via the SDK, an OTP seed from the secure storage area to activate the OTP application, the OTP application being transparent to the user, the OTP seed stored in the secure storage area coupled to, and accessible by, the electronic representation of the pin;

generating, via the OTP application, the OTP based on the OTP seed;

populating, via the SDK, transparent to the user, the OTP in an OTP field on the second mobile application, independent of user-interaction;

validating, via the authentication server, the OTP; and executing the electronic communication request.

2. The method of claim 1 wherein the login credentials include the ID and a biometric.

3. The method of claim 1 wherein the mobile token pin is one or more of:
an alphanumeric character set;
a numeric character set; and
a biometric.

4. The method of claim 1 wherein the electronic representation of the pin is a representation of the pin the user selected and inputted when authenticating the user for a first time.

5. The method of claim 1 wherein, when the mobile token pin does not correspond to the electronic representation of the pin stored in the secure storage area, the method further comprises blocking access to the secure storage area.

6. The method of claim 1 wherein, when the mobile token pin does not correspond to the electronic representation of the pin stored in the secure storage area, the method further comprises:
enabling inputting a first alternative mobile token pin; and
verifying the inputted alternative mobile token pin.

7. The method of claim 6 wherein, when the first alternative mobile token pin does not correspond to the electronic representation of the pin stored in the secure storage area, the method further comprises:
enabling inputting a second alternative mobile token pin; and
verifying the inputted second alternative mobile token pin.

8. The method of claim 7 wherein, when the second alternative mobile token pin does not correspond to the electronic representation of the pin stored in the secure storage area, the method further comprises destroying the secure storage area by erasing the electronic representation of the mobile token pin and the OTP seed stored in the secure storage area.

9. The method of claim 5 wherein, when the secure storage area is not accessible, the method further comprises locking-down the OTP application.

10. A system for transparently integrating a one-time-password ("OTP") application within a mobile application, the system comprising:
a mobile device, the mobile application running on the mobile device, the mobile device comprising:
a display for displaying data on the mobile device;
a receiver module configured to receive an electronic communication request from a user of the mobile application, the request requiring an OTP to authenticate the communication request;
a processor module configured to process the communication request and trigger a prompt to the user to input a mobile token pin;
an authentication module configured to confirm, via an authentication server, that the mobile token pin corresponds to an electronic representation of the pin stored in a secure storage area on a mobile device associated with the user;

wherein:
the secure storage area on the mobile device further stores an OTP seed configured to trigger the generating of an OTP via the OTP application, the secure storage area being a secure portion of memory on the mobile device, whereby the portion of memory is only accessible and visible to the mobile application upon receipt of the mobile token pin;

in response to the confirmation, the secure storage area is configured to release the OTP seed to the OTP application, the OTP application being transparent to the user; and the processor module is further configured to:
activate the OTP application to generate, based on the released OTP seed, an OTP;
populate, transparently, the OTP in an OTP field, independent of user-interaction;
verify the OTP with the authentication server via the authentication module; and
execute the electronic communication request.

11. The system of claim 10 wherein the mobile token pin is one or more of:
an alphanumeric character set;
a numeric character set; and
a biometric.

12. The system of claim 10 wherein the electronic representation of the pin is a representation of the pin the user selected and inputted when authenticating the user for a first time.

13. The system of claim 10 wherein when the mobile token pin does not correspond to the electronic representation of the pin stored in the secure storage area, the system is further configured to block access to the secure storage area.

14. The system of claim 13 wherein when the secure storage area is not accessible, the system is further configured to lock-down the OTP application.

15. The system of claim 10 where the communication request is a first communication request and when the first communication request is executed, the system is further configured to receive a second communication request from the user, the second communication request requiring the OTP to authenticate the second request.

16. The system of claim 15 wherein in response to the receipt of the second communication request after a predetermined shortened time period, the system is further configured to receive from the user, re-input of the mobile token pin in order to generate a new OTP.

17. A secure storage apparatus on a mobile device for securing user-access to a mobile application, the secure storage apparatus comprising:
an electronic representation of a mobile token pin stored in the secure storage, the electronic representation is a representation of the pin a user selected and inputted when authenticating the user for a first time on the mobile application;
an OTP seed stored in the secure storage, the OTP seed coupled to, and accessible by, the electronic representation of the pin;
the secure storage being a secure portion of memory on the mobile device, whereby the portion of memory is only accessible and visible to the mobile application upon receipt of the mobile token pin;

wherein:
when the mobile token pin is inputted into the mobile application on the mobile device, the mobile application is configured to transmit the mobile token pin to an authentication server for verification, the authentication server is configured to compare the inputted mobile token pin to the electronic representation of the pin stored in the secure storage; and in response to the verification:
- the secure storage is configured to release the OTP seed from the secure storage;
- the OTP seed is configured to activate an OTP application associated with the mobile application; and
- the OTP application is configured to generate the OTP.

18. The secure storage apparatus of claim 17 wherein, when the mobile token pin does not correspond to the electronic representation of the pin stored in the secure storage, the secure storage is locked.

19. The secure storage apparatus of claim 17 wherein when the secure storage is not accessible, the mobile application is configured to lock-down the OTP application.

20. The secure storage apparatus of claim 17 wherein in response to the generating of the OTP, the OTP application is further configured to:
- transmit the OTP to the authentication server for verification;
- populate, transparent to the user, the OTP in an OTP field, independent of user-interaction; and
- enable user-access to the mobile application.

* * * * *